(12) United States Patent  
Asma

(10) Patent No.: US 7,707,930 B2
(45) Date of Patent: May 4, 2010

(54) LOLLIPOP MACHINE

(75) Inventor: Seferinus Jelle Asma, Veldhoven (NL)

(73) Assignee: CFS Weert B.V., Weert (NL)

( * ) Notice: Subject to any disclaimer, the term of this patent is extended or adjusted under 35 U.S.C. 154(b) by 725 days.

(21) Appl. No.: 10/578,812

(22) PCT Filed: Nov. 3, 2004

(86) PCT No.: PCT/NL2004/000768

§ 371 (c)(1),
(2), (4) Date: Mar. 8, 2007

(87) PCT Pub. No.: WO2005/041679

PCT Pub. Date: May 12, 2005

(65) Prior Publication Data

US 2007/0272089 A1    Nov. 29, 2007

(30) Foreign Application Priority Data

Nov. 4, 2003    (NL) .................................... 1024700

(51) Int. Cl.
*A23L 1/00* (2006.01)
(52) U.S. Cl. ........................ 99/450.1; 99/353
(58) Field of Classification Search ........... 99/352–355, 99/485–489, 494, 450.1–450.8, 453; 227/117; 425/126.2; 426/91, 134
See application file for complete search history.

(56) References Cited

U.S. PATENT DOCUMENTS 1,809,358 A    6/1931    Savage 3,038,635 A * 6/1962 Rasmusson .................. 221/81
4,008,812 A * 2/1977 Stuart ......................... 198/444
4,130,936 A * 12/1978 Cottrell ....................... 29/809
4,714,419 A * 12/1987 Nielsen ..................... 425/126.2
4,729,501 A * 3/1988 Lowrance .................. 227/117
6,402,496 B2    6/2002 Ishikawa et al. ........... 425/116
7,344,742 B2 * 3/2008 Wray et al. .................. 426/91

FOREIGN PATENT DOCUMENTS

| EP | 0 073 535 A2 | 3/1983 |
| GB | 406220 | 2/1934 |
| WO | WO 0041573 | 7/2000 |

\* cited by examiner

*Primary Examiner*—Timothy F. Simone
(74) *Attorney, Agent, or Firm*—Dobrusin & Thennisch PC

(57) ABSTRACT

Device for manufacturing lollipops, including a rotatably driven drum provided with lollipop moulds at its circumference, a supply for supplying a strand of lollipop material to the lollipop moulds and a discharge for lollipops formed in the lollipop moulds, wherein the drum is disposed on a hollow shaft and wherein the lollipop moulds are disposed at the circumference of a casing, which defines an annular space with the hollow shaft, wherein the hollow shaft is provided with a first passage and a second passage, each forming a fluid connection between the cavity in the hollow shaft and the annular space, wherein the hollow shaft is provided with a fluid supply and a fluid discharge, which fluid supply is in fluid connection with a pressure source for cooling air, wherein the lollipop moulds comprise lower moulds that are fixed to the casing and the casing with the lollipop moulds forms a detachable part of the device and can be slid on the hollow shaft when being placed or removed.

49 Claims, 12 Drawing Sheets

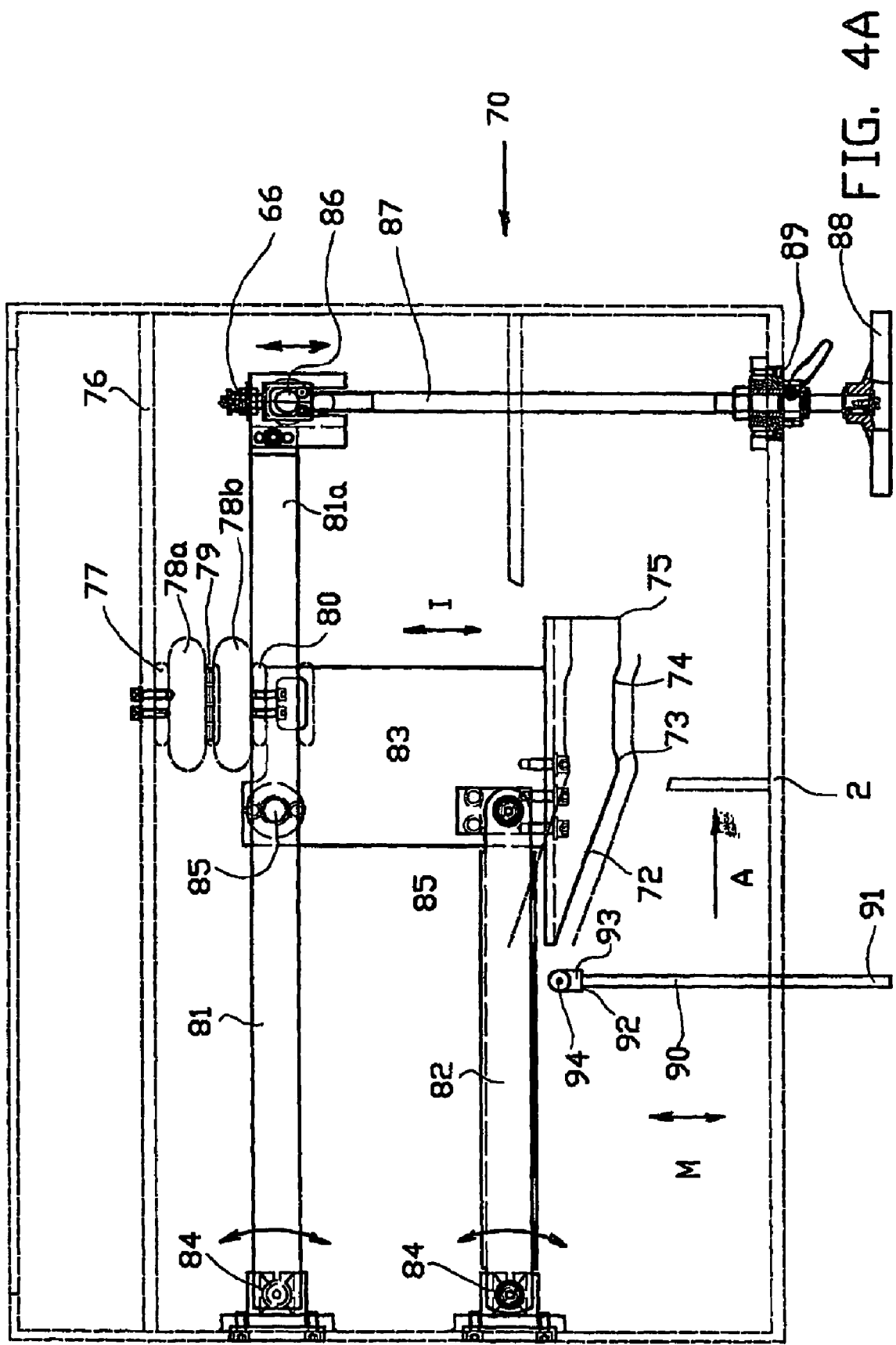

LOLLIPOP MACHINE

This application is the National Stage of International Application No. PCT/NL2004/000768, International Filing Date, Nov. 3, 2004, which designated the United States of America, and which international application was published under PCT Article 21(2) as WO Publication No. WO 2005/041679 A2 and which claims priority from The Netherlands Application No. 1024700, filed Nov. 4, 2003.

TECHNICAL FIELD

The invention relates to a device for manufacturing lollipops.

BACKGROUND OF INVENTION

It is known to make lollipops using a lollipop machine that is provided with a drum rotating about a horizontal shaft, which drum is provided with a series of moulds at its circumference. The moulds are each built up from a lower mould that is fixed to the drum and an upper mould that can be folded up into an open position, in which the leading end of a strand of confectionery can be inserted onto the lower mould, and be folded into a closed position, in which between the upper mould and the lower mould a piece of confectionery has been accommodated. From a direction parallel to the drum axis a stick is then inserted in the mould, and from the opposite direction a pressure piston reduces the mould cavity, in order to shape the lollipop on the stick.

After opening the moulds again by folding up the upper moulds the lollipops are sequentially removed from the lower moulds and transferred by means of a transfer device to a conveyor usually provided with a series of clamps in order to be transported to a next processing station, such as a packaging station.

The moulds including the drum are then rotated further to the point where the strand reaches the moulds in order to be filled again with confectionery. The confectionery is placed in the moulds at a temperature of over 60 degrees C. The confectionery may stick to the steel surfaces of the moulds. In order to prevent this the moulds are passed through a cooling path prior to the lollipops being removed from the moulds. However, this requires time, which adversely affects the capacity. The length of the cooling path can be increased by increasing the diameter of the drum, but this increases the mass of the drum, as a result of which more energy is needed for bringing and keeping the drum in motion and an optional change of drum is difficult.

In case a drum is used having replaceable mould blocks that have the shape of a segment of a circle, in which blocks lower moulds are provided, it is known to provide the fixed drum casing with an annular channel for cooling liquid, wherein a fixed discharge line and a fixed supply line extend radially from the annular chamber to an axis of rotation, and then through the shaft to fixed connections while rotational couplings are placed in between. The radial distance between the annular chamber and the moulds is rather large here, as a result of which the cooling is less efficient. Furthermore replacing the moulds is laborious.

It is furthermore known to cool the moulds on a drum using cooling air, which enters at an end of a stationary hollow shaft, is stopped by a transverse partition in the hollow shaft, then escapes through radial apertures to a stationary chamber, in order to flow out through radial apertures in a wall having the shape of a segment of a circle and situated near the inner surface of the drum for cooling the drum. The cooling air subsequently flows through a slit-shaped space over a circular wall and then to a hollow space of the drum situated within there in order to flow into the hollow shaft again via apertures situated at the other side of the transverse partition and finally exit at the other end of the hollow shaft. The drum is provided with series of lower moulds extending in axial direction and circumferential direction, which lower moulds each can be moved upwards by means of plungers that extend radially outwards from the slit-shaped space. Said known device and cooling system accommodated therein is complex. Replacing the drum is only possible at high costs and involves great effort.

SUMMARY OF THE INVENTION

It is a first object of the invention to improve on this.

From one aspect the invention to that end provides a device for manufacturing lollipops, comprising a rotatably driven drum provided with lollipop moulds at its circumference, a supply for supplying a strand of lollipop material to the lollipop moulds and a discharge for lollipops formed in the lollipop moulds, wherein the drum is disposed on a hollow shaft and wherein the lollipop moulds are disposed at the circumference of a casing, which defines an annular space with the hollow shaft, wherein the lollipop moulds for instance comprise lower moulds that are solid with the casing and upper moulds that are hinged to the lower moulds, wherein the hollow shaft is provided with a first passage and a second passage, each forming a fluid connection between the cavity in the hollow shaft and the annular space, wherein the hollow shaft is provided with a fluid supply and a fluid discharge, which fluid supply is in fluid connection with a pressure source for cooling air, wherein the casing with the lollipop moulds forms a detachable part of the device and can be slid on the hollow shaft when being placed or removed.

The casing with lollipop moulds can be replaced as a unity by placing and guiding onto the hollow shaft. The casing as a unity with the hollow shaft defines a simple annular chamber for the cooling fluid, so that connections and sealings can be simple and limited in number. Due to the large cooling efficiency the diameter of the drum can be kept limited.

Preferably the casing is rotatable about the hollow shaft. The thus stationary hollow shaft forms a supply for cooling fluid which in a stationary sealing manner can be connected to further lines that are fixed to the device.

Preferably the hollow shaft is provided with a longitudinal partition which separates the supply from the discharge, so that its connections can be situated at the same shaft end.

For enhancing the cooling the inner surface of the casing may be provided with cooling ribs.

From one aspect the invention provides a device for manufacturing lollipops, comprising a frame and a drum disposed thereon, which drum is provided with a casing having thereon a circulating series of lower moulds and a series of upper moulds that are movable between an open position, for receiving lollipop material or discharge of a lollipop, and a closed position for forming a mould cavity, wherein the casing as a whole is detachably coupled/connected to the frame. Preferably the casing is disposed on a hollow shaft, that is stationary and on which bearings for the casing are provided, wherein the casing is detachable from the hollow shaft and the hollow shaft is attached on the frame.

In known lollipop forming machines the moulds are defined by a lower mould, a movable upper mould and a piston or stamp that is movable in between them. It may happen that more confectionery is present in the mould cavity than wanted, for instance because residues of the previous operation session were left behind. The upper mould and/or the stamp are then impeded in reaching their end position, in which the mould cavity has minimum dimensions. As a result the upper moulds on the one hand may be subjected to large deformation forces, and the stamps on the other hand may be subjected to large pressure forces. This may result in permanent deformation or rupture of those parts, which may a necessitate standstill of the machine for repair.

It is a further object of the invention to improve on this.

From one aspect the invention to that end provides a device for manufacturing lollipops, comprising a rotatably driven drum provided with lollipop moulds at its circumference, a supply for supplying a strand of lollipop material to the lollipop moulds and a discharge for lollipops formed in the lollipop moulds, wherein the lollipop moulds are disposed at the circumference of a casing, wherein the lollipop moulds are bounded by mould members (or mould parts) of which at least one is movable from a free position to a wanted mould position while exerting pressure on the lollipop mass in the lollipop mould, wherein the device is furthermore provided with means for stopping the motion of the mould member to the wanted mould position before reaching the wanted mould position in case of a deviation in said motion detected by detection means.

As a result too large a pressure build-up on the part in question is prevented, in case the mould contains more material than intended, for instance due to residues of material that have been left behind.

In an embodiment the detection means in question are adapted for detecting an impediment in the movement of the part in question. A movement or distance sensor may be used to that end, which movement or distance sensor controls the motion of the part in order to stop it in case of an impediment.

In another embodiment the detection means in question are adapted for detecting a certain pressure build-up. When a certain pressure on the part is reached the motion may thus be stopped.

The part in question may be an upper mould known per se, which is hinged to the drum and movable between an open position for access of lollipop material or removal of the lollipop formed, to or from, respectively, the lollipop mould in question.

Use can be made of a body having the shape of a segment of a circle, which is movable in radial direction with respect to the drum. The body having the shape of a segment of a circle may be provided with a carrier and an insert piece of hard material for exerting press-on forces on the upper moulds, wherein the insert piece is detachably attached to the carrier. The insert piece can be adjustably tiltable with respect to the carrier in order to be suited to a drum of an altered diameter.

The part in question may alternatively or additionally be a pressure/mould piston movable in drum-axial direction, wherein the device is furthermore provided with means for pressing the mould piston in the mould cavity.

Preferably the means for pressing the mould piston in the mould cavity comprise a piston rod connected to the mould piston and a cam track for axial movement of the end of the piston rod that is opposite the mould piston.

In an embodiment the detection means are adapted for detecting a movement of the cam track or the construction parts connected thereto.

The detection means may be adapted for operation by medium/fluid pressure, particularly gas pressure (and then be pneumatically active), between a fixed part and a movable part. A bellows may be used.

For limiting the length of the way the lollipop material has to traverse before being discharged to a conveyor for transport to a next station, such as cooling, and thus the diameter of the drum, it is advantageous when the mould/press path is kept short. To that end it is suggested according to the invention to provide the said cam track, in general, with an inclined run-in portion and a post-pressing portion, where the pressure is substantially preserved for a certain track length. The post-pressing portion preferably is substantially straight and preferably runs according to a line in a radial plane, that is transverse to the drum axis.

Due to having the post-pressing take place for some time it is also ensured that even the smallest parts of the mould cavity get filled with confectionery. This may also apply to small holes in the insertion ends of the lollipop sticks, due to which a better grip of lollipop stick on the lollipop head is achieved.

Preferably the piston rods are provided with a roller for engaging the cam track, due to which friction is minimised, particularly at the location of the lengthened post-pressing track.

From one aspect the invention provides a device for manufacturing lollipops, comprising a rotatably driven drum provided with lollipop moulds at its circumference, a supply for supplying a strand of lollipop material to the lollipop moulds and a discharge for lollipops formed in the lollipop moulds, wherein the lollipop moulds are disposed at the circumference of a casing, wherein the lollipop moulds each comprise a first mould, such as a lower mould that is fixed to the casing and a second mould, such as an upper mould that is hinged to the casing, which are movable with respect to each other between an open position, for access of lollipop material or removal of a formed lollipop, to or from, respectively, the lollipop mould in question and a position closed by first press-on means, in which the lollipop can be formed under pressure, wherein the device is furthermore provided with means for limiting the pressure to a certain wanted value. Preferred embodiments are described in the attached claims, the contents of which are deemed included in here.

From a further aspect the invention provides a device for manufacturing lollipops, comprising a rotatably driven drum provided with lollipop moulds at its circumference, a supply for supplying a strand of lollipop material to the lollipop moulds and a discharge for lollipops formed in the lollipop moulds, wherein the lollipop moulds are disposed at the circumference of a casing, wherein the device is furthermore provided with means for bringing a lollipop stick into the lollipop mould, oriented in a direction parallel to the drum axis, wherein the lollipop heads preferably are situated at the side of the sticks facing the device, wherein the device comprises means for taking the lollipops out of the lollipop moulds and transporting them, with the lollipop sticks parallel to the drum axis, in a first orientation with the head proximal to the device, wherein the device is furthermore provided with means for converting the orientation to a second orientation, wherein the discharge is adapted for discharging the lollipops in the second orientation. In this way the orientation of the lollipops can be adjusted within the device, so compactly, to the conveyor transporting the lollipops to the next station and to the orientation of said next station.

Preferably the conversion means are adapted for a conversion in an orientation of 180 degrees.

The conversion means may comprise a number of cooperating transport disks, preferably two, of which the axes of rotation are perpendicular to each other.

From one aspect the invention provides a device for transferring lollipops provided with sticks from a location of receipt to a location of discharge, comprising a rotatingly driven disk and a series of stick clamps fixedly attached thereto. The stick clamps, comprising two clamping members or clamping jaws, are movable and preferably biassed to a—stable—closed position, in which they are able to clamp a stick, particularly parallel to the disk axis. By means of fixedly positioned operation means, such as a cam engaging on an operation arm of one of the clamping members, the clamping members can be urged apart to an open position, in which a stick can be received or taken out, respectively, wherein preferably one of the clamping members is immovably attached on the disk and the other clamping member is biassed towards thereto and is temporarily movable away from the immovably attached clamping member, against the biassing force, by the operation means. Due to cooperation of (rigid) disk and (rigid) clamp the position of the stick may be positively known, due to which failure is reduced. Such a disk can be deployed at various locations, such as in a train of such disks, when receiving lollipops from a distribution disk, etcetera.

From one aspect the invention provides a device for manufacturing lollipops, comprising a frame and a drum disposed thereon, which is provided having a casing with a circulating series of lower moulds thereon and a series of upper moulds that are movable between an open position, for receipt of lollipop material or discharge of a lollipop, and a closed position for forming a mould cavity, wherein the upper moulds are provided with an accommodation space for slidingly accommodating a guide that is fixed to the frame for said motion of the upper moulds. As a result the motion of the upper moulds is positively guided and the orientation of the upper moulds can always be controlled.

Preferably the guide is formed like a unity, such as a formed piece, for instance a moulded piece such as a bent plate, or a (bent) rod.

The guide may define a guiding edge, wherein the accommodation space may surround the guiding edge for more than 180 degrees, which enhances the controlling of the upper moulds.

Preferably the accommodation space is oriented axially away from the frame when in the closed position of the upper moulds.

The guide may have a path length corresponding to the length of the path of the casing between the point of receipt and the point of discharge.

The upper moulds may be hinged to the drum, wherein the hinge is situated closer to the frame than the free end of the upper moulds, preferably approximately halfway the upper moulds.

The invention will be elucidated on the basis of the exemplary embodiment shown in the attached drawings, in which:

BRIEF DESCRIPTION OF THE DRAWINGS

FIG. 4A shows a schematic top view of a device for limiting the pressure exerted on pressure pistons for the mould cavities of the device of FIG. 1;

DETAILED DESCRIPTION OF THE INVENTION

Figure 1:
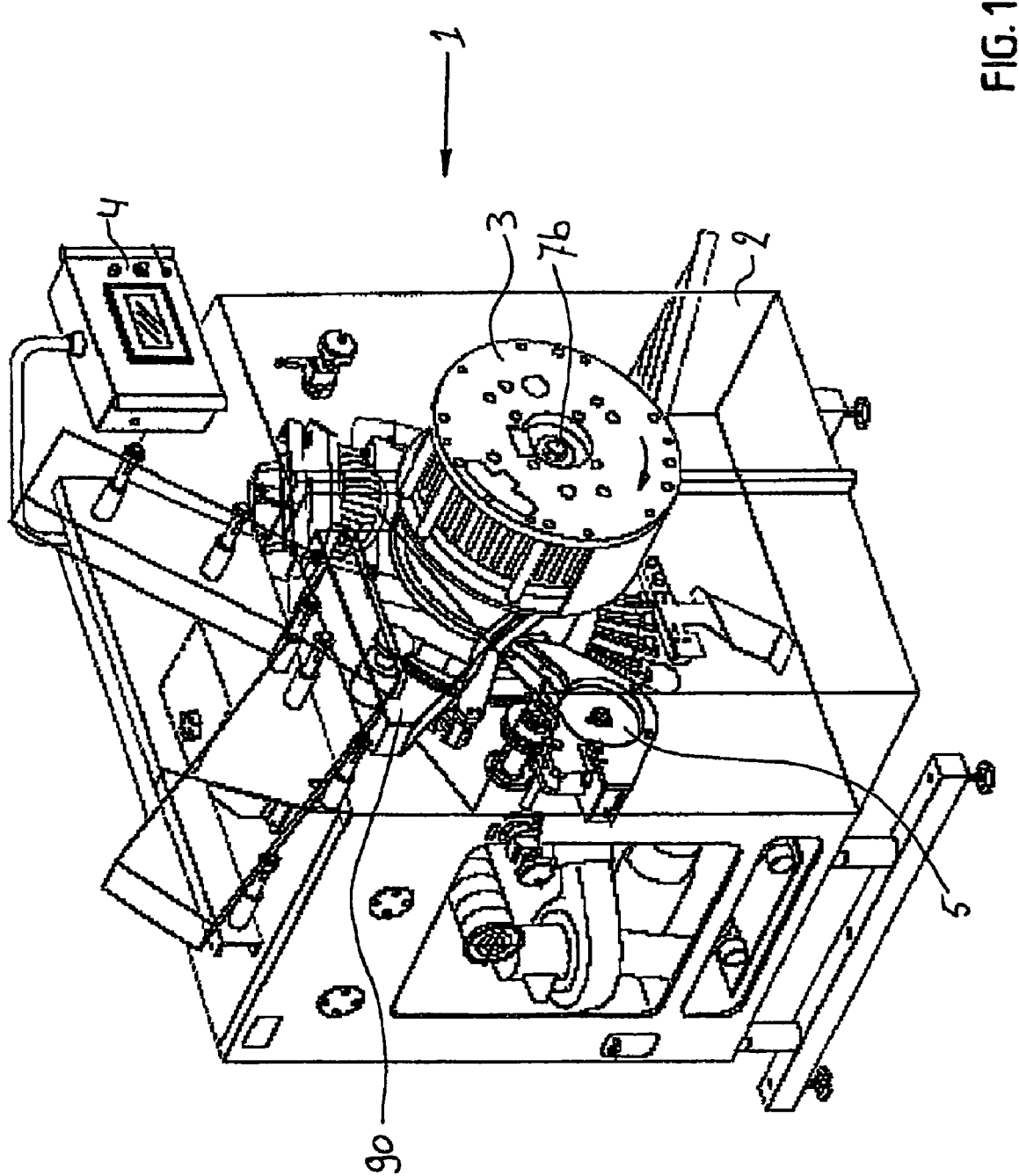
FIG. 1 shows a view of an exemplary embodiment of a device according to the invention.
Figure 1A:
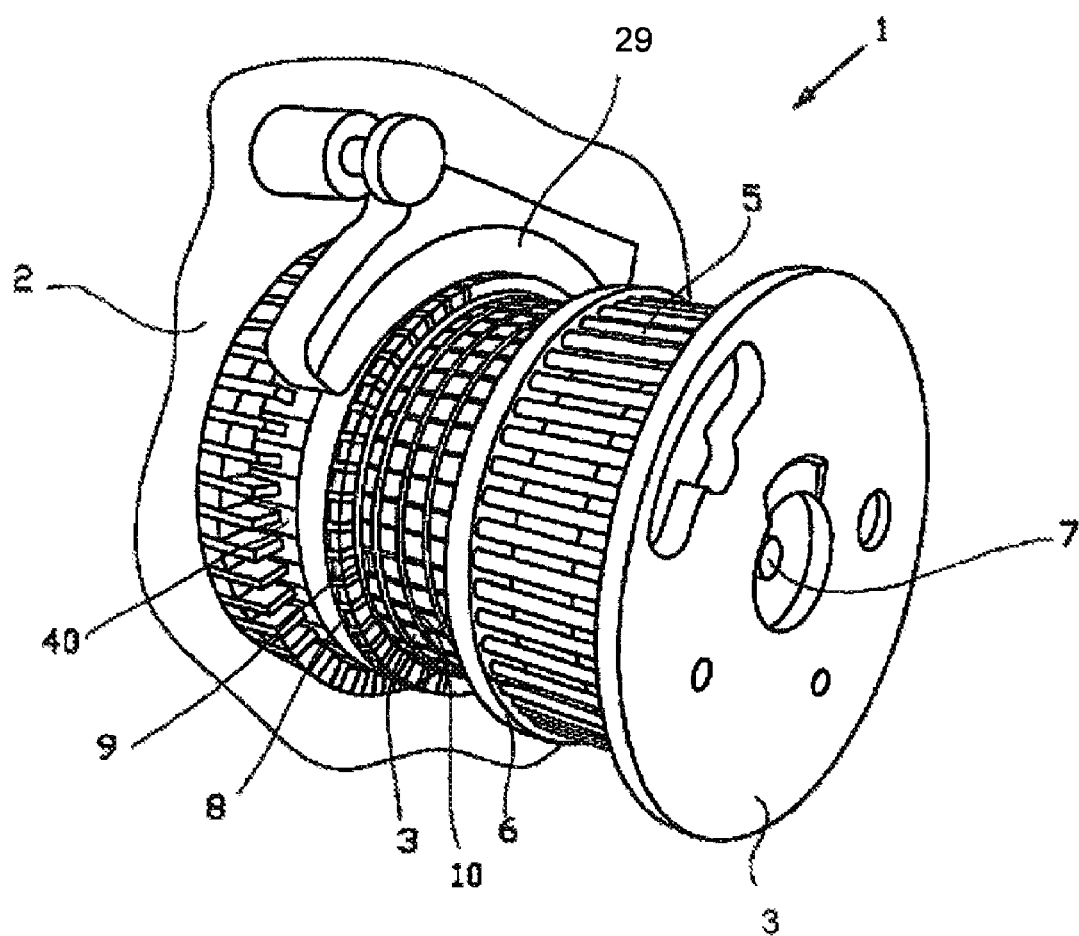
FIG. 1A shows a view of an insert piece in the device according to FIG. 1.

FIG. 1 schematically shows device 1 for manufacturing lollipops, comprising a frame 2 on which, in manner known per se, a drum 3 has been placed, which is rotatable in the direction A. The device 1 is provided with an operation panel 4 for operating the device 1 and programming its operation unit that is not further shown, as well as with a supply 5 for lollipop strand material and a stock 90 of lollipop sticks. The drum 3 is made of steel and is hollow having a drum wall 10, which in the circumferential surface is provided with a series of circumferential grooves 8 that serve for cooperation with a tool for lifting a manufactured lollipop out of the mould and a series of longitudinal grooves 9 that are transverse thereto. Longitudinal grooves 9 serve to guide the sticks. At the side of the frame 2 the drum 3 is provided with a circumferential series of upper moulds 40, which are hinged to the drum 3.

Figure 2C:
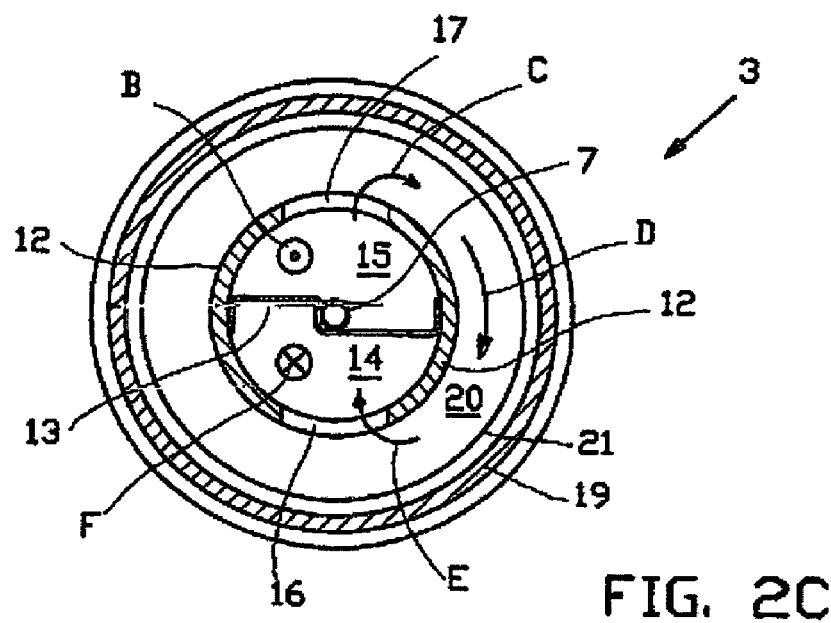
FIG. 2C shows a cross-section of the drum of FIG. 2A.
Figure 2A:
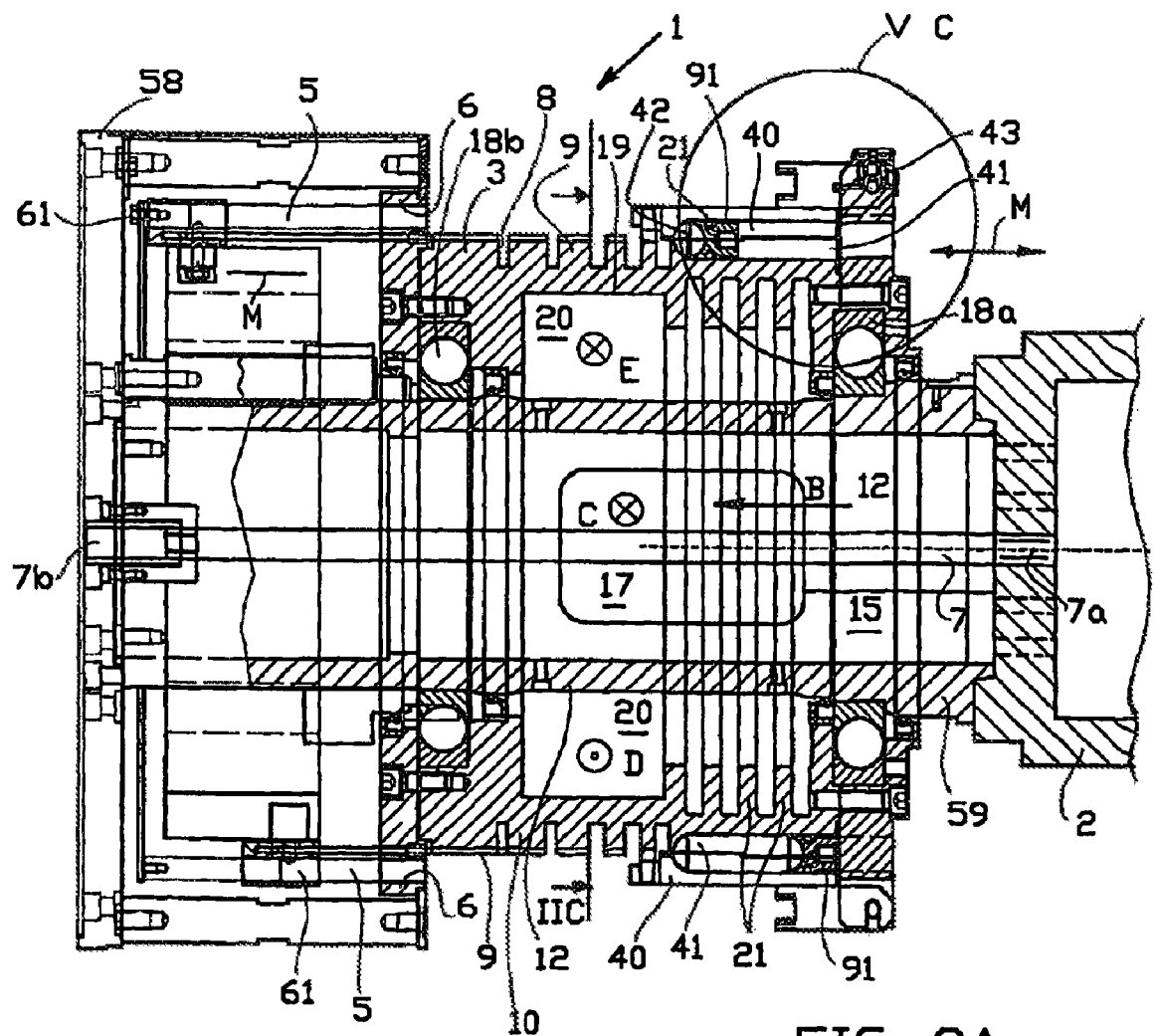
FIG. 2A shows a longitudinal section of a drum in the device of FIG. 1.
Figure 2B:
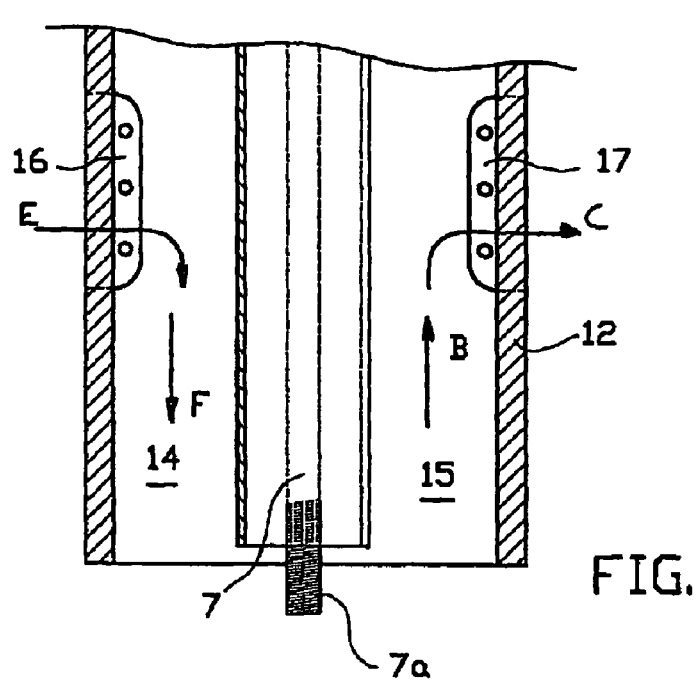
FIG. 2B shows a cross-section of a hollow shaft in the drum of FIG. 2A.

In FIG. 2A the lower moulds 41 are also shown, as well as the mould cavity 42 defined by both. Towards the frame 2 the mould cavity is bounded by a piston 91, which is attached to a press-on pin 90, also shown in FIG. 4A and which can move in the directions M.

Figure 5A:
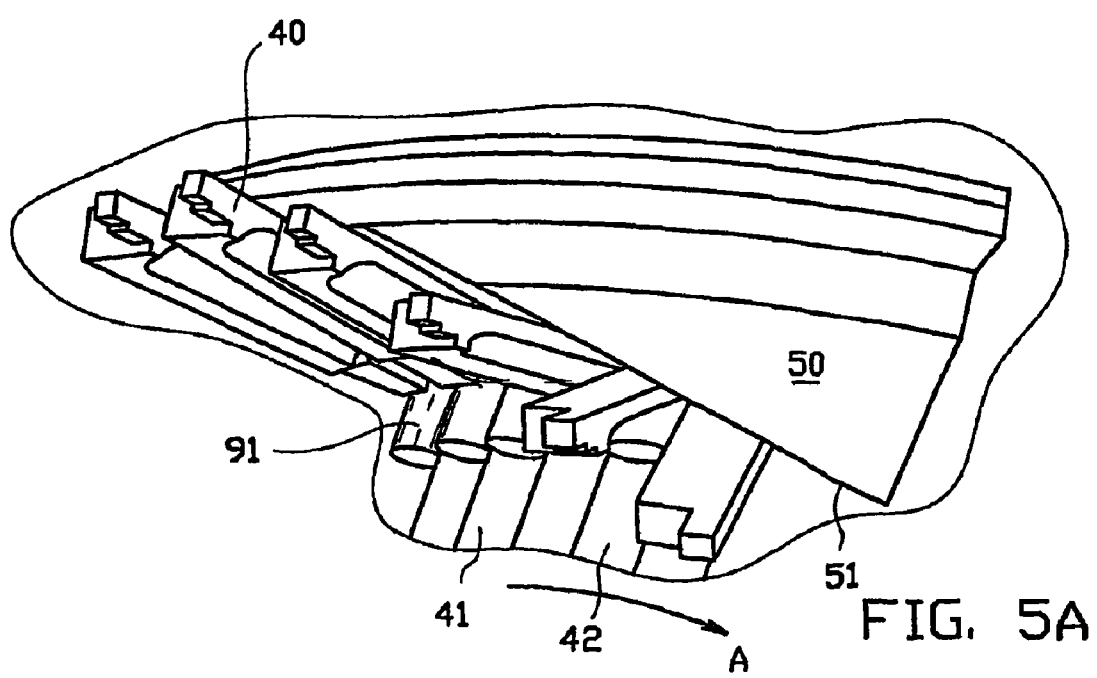
FIG. 5A shows an example of a means for closing the upper moulds in the device of FIG. 1.
Figure 5B:
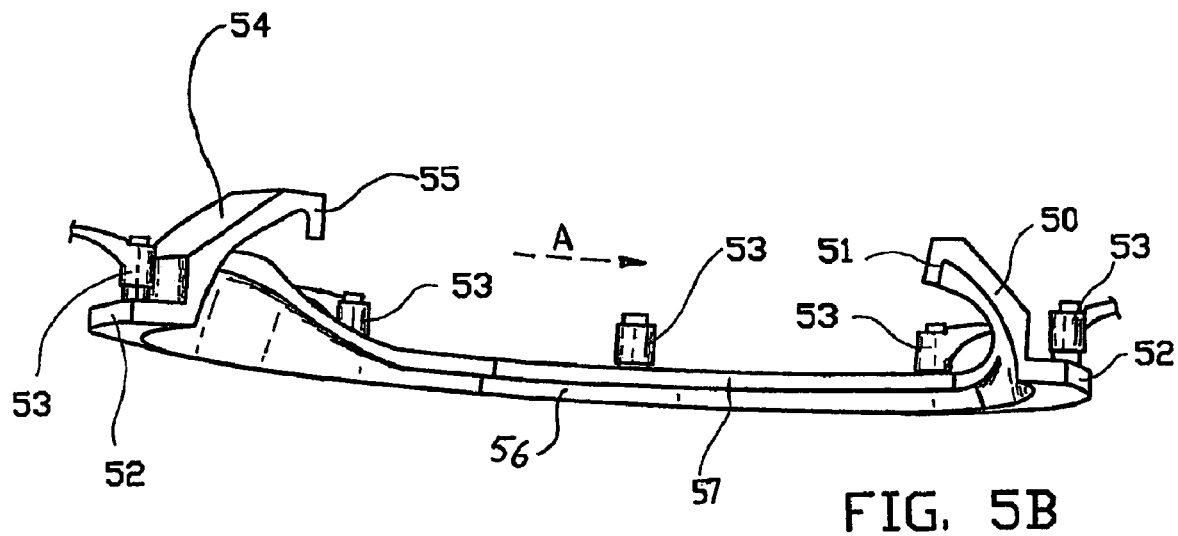
FIG. 5B shows a view of the closing means of FIG. 5A.
Figure 5C:
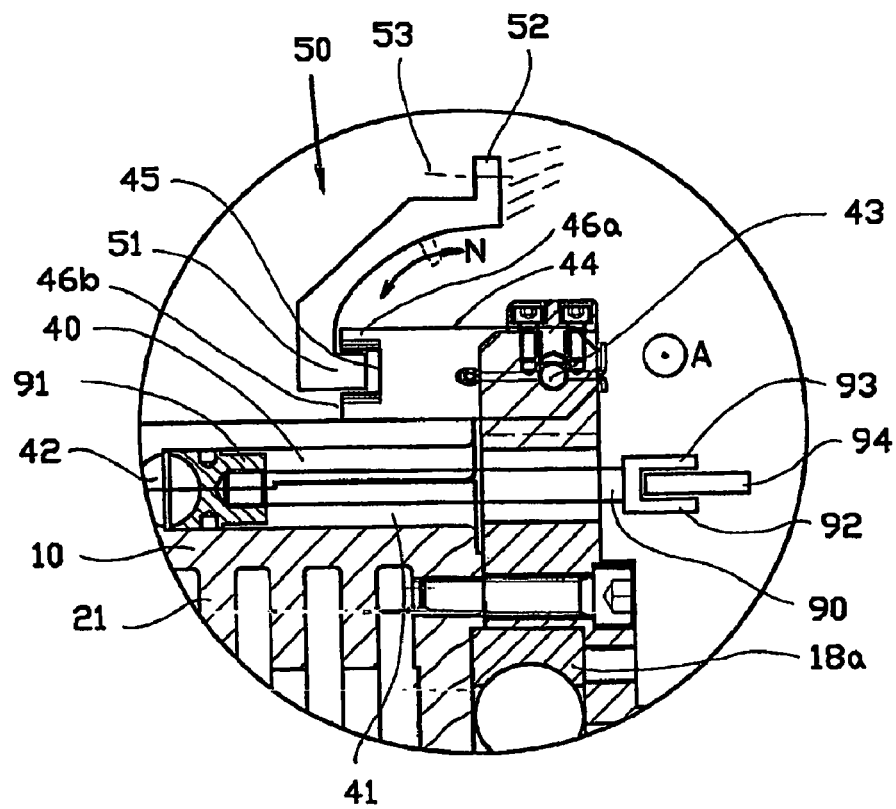
FIG. 5C shows the closing means of FIG. 5A in cross-section, as a detail of FIG. 2A.

As schematically shown in FIG. 5A, the upper moulds 40 may also fold downward about hinges 43 (FIG. 5C). The upper moulds 40 together with the lower moulds 41 that are fixed to the drum wall thus define a mould cavity 42 for confectionery that is not further shown. Said confectionery is supplied to the drum in a manner known per se, at the location of the closing track for the moulds. FIG. 5A shows an example of a guide 50 that is fixed to the frame 2, which guide urges the open upper moulds 40 into a closed position, by means of a guiding edge 51. Said guide is further shown in FIG. 5B. It regards a rigid moulded piece provided with a flange 52 with which the guide can be statically attached to the machine 1, by means of screws with handles 53. At the shown run-out end, the guiding edge 51 has been converted into an axial orientation, towards the machine 1. As can be seen in FIGS. 2A and 5C the guiding edge engages snugly into a slit 45 which is formed between two protrusions 46a, b on elevation 44 of upper mould 40. In the situation shown in FIG. 5C the upper mould has almost been brought in the closed position, yet it is not yet pressed-on. Due to the engagement of the guiding edge 51 into the slit 45, the multi-sided engagement (more than 180 degrees), the upper moulds are held fully controlled when being moved from a fully opened position to the closed position, as a result of which faults in said motion are prevented. The moulded piece furthermore offers the possibility to exactly and ideally select the course of the guiding edge between the location where the upper moulds are open and the closed position, so that an optimal, friction-poor motion of the upper moulds can be realised, so that deformation of the upper moulds is prevented. In FIG. 5B the guide 51 is contiguous to guide 56, which has a guiding edge 57 with which the upper moulds are kept open. Upstream thereof guide 54 is present, of which the guiding edge 55 starts in an orientation for a closed position and in accordance with a selected course smoothly changes into an orientation for an open position of the upper moulds, at the location of the transition to guide 56. The guides 54, 56 and 50 thus form a positive guide and retaining means for the upper moulds in a circulating path that is only interrupted where the press-on means for the upper moulds are situated. The position of the upper moulds thus is fully controlled at all times.

The location of engagement of guiding edges 51 etc. on the upper moulds 40 lies closer to the hinge 43 than to the free end of the upper moulds 40. As a result moments exerted on the upper moulds are kept limited.

In the closed position shown the accommodation space 45 is oriented axially away from the frame, as a result of which the upper moulds are also kept confined in axial direction.

At the side facing away from the frame 2, the drum 3 is provided with a plate 4 and spaced apart from it with a further plate 6 attached to the casing 10 of the drum 3 (see FIG. 2A). Along guides 5 extending between the plates 5 and 6, plungers 61 may be reciprocally moved in axial direction M (FIG. 2A). Said plungers 61 serve to axially move the lollipop sticks in the longitudinal slits 9 in the outer surface of the drum 3. The part 4, 5, 6 is attached in a rotation-fixed manner to the drum wall 10, as can be seen in FIG. 2A. In FIG. 2A a hood 58 is also shown, on which a stock of sticks and a supply that are not further shown may be disposed.

By means of bearings 18, 18b, the drum 3 is rotatably bearing-mounted on a hollow shaft 12, which is fixed to frame 2. Between the hollow shaft 12 and the casing 10 a continuously circulating annular chamber 20 is defined, of which the radial outer wall 19 is provided with cooling ribs 21 in the area adjacent to the lower moulds 41.

The hollow shaft 12 is provided with two diagonally opposite passages 16 and 17, as is also shown in FIG. 2C. This figure also shows that the inside of the hollow shaft 12 is divided in longitudinal direction by a partition 13, that is attached to a continuous stationary shaft or long bolt 7 shown in FIG. 2A, which shaft is attached by a thread 7a in a nut 2c provided on the frame 2. The bolt 7 has an end 7b that can be engaged by a tool for fastening or loosening the bolt 7. Due to partition 13, two longitudinal spaces 14 and 15 have been formed, wherein the longitudinal space 15 serves for supply in the direction B of cooling air flowing through opening 17 (direction C), subsequently through the annular chamber 20 (direction D), in close cooling contact with the ribs 21, and subsequently through opening 16 flowing out again (direction E) in longitudinal space 14 in order to be discharged (direction F) to for instance a free drain. The cooling air in direction B is supplied from a pressure source of cool air that is not further shown.

The diameter of the drum 3 may be kept relatively small here, for instance 400 mm. The drum 3 shown in FIG. 2A, due to its relatively small diameter is limited as to weight, so that is may be placed or replaced without hoisting tools if necessary. The unity shown in FIG. 2A may be replaced by loosening the attachment end 59 of the frame 2 of the machine 1. Alternatively it is possible to leave the shaft 12 on the frame 2 of the machine and only to replace the other parts of the drum 3, again as a unity. The hollow shaft 12 here remains fixed to the frame 2. The bearings 18a, 18b are then replaced along.

Figure 3A:
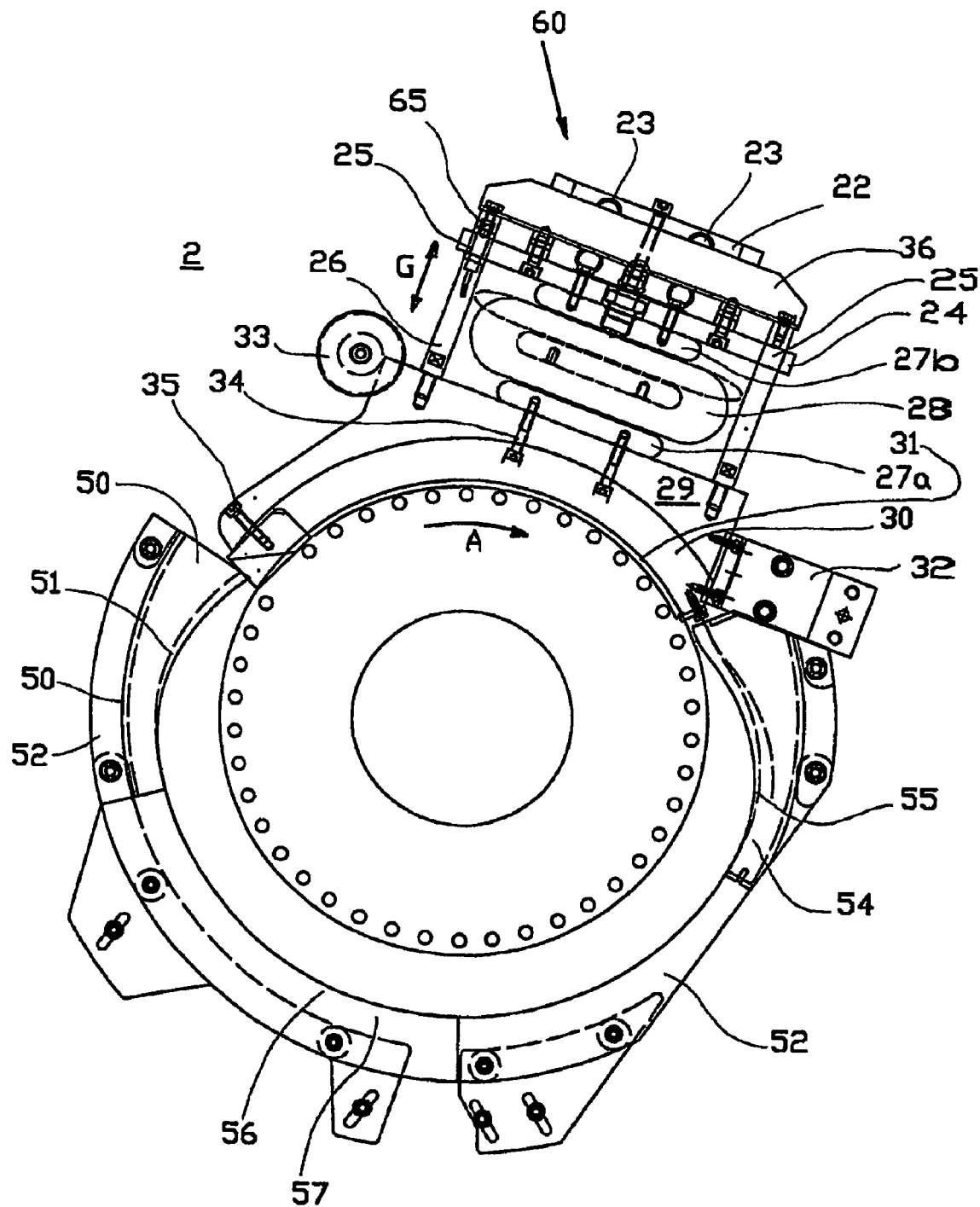
FIG. 3A shows a front view of an exemplary embodiment of a device for limiting the pressure exerted on the upper moulds of the device of FIG. 1.
Figure 3B:
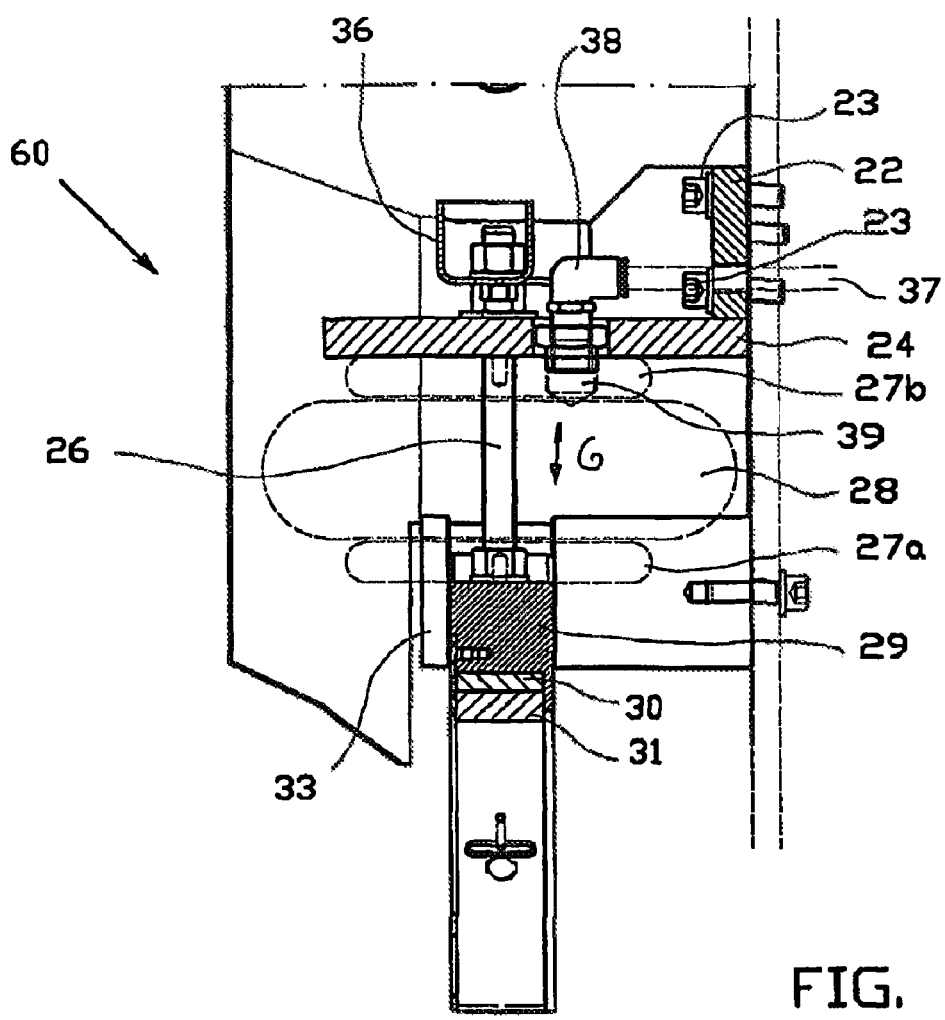
FIG. 3B shows a side view of the device of FIG. 3A.

In the FIGS. 3A and 3B a mechanism is shown with which the press-on force to be exerted by the upper moulds 40 can be limited. The mechanism 60 comprises a plate assembly 22, 24 that is attached fixedly to the frame 2 by means of bolts 23, wherein the plate 24 is provided with smooth passages 25 through which upright rods 26 extend. At a lower end the rods 26 are fixedly attached to an elongated, horizontal block 29, which at a circular lower side is provided with a curved plate 30, on which a pressure lining 31 is attached. The plate 30 is attached to the block 29 by means of bolts 34. Optionally the lining 31 may be hinged to the block 29 about a horizontal axis, parallel to the drum axis, for adjusting the location of the lining with respect to the drum 3. An insert piece 35 guides the upper moulds during the transition from the guide 50 to the lining 31.

The block 29 is freely suspended from the rods 26, for vertical motion in the direction G, yet in horizontal direction from and towards the frame 2 it is confined by a holder 33 fixed to the frame 2 and a holder 32 fixed to the frame 2. At the upper end the rods 26 are shielded by means of hood 36. Said hood is fixedly attached to the upper ends of the rods 26, and is within the operation range of a line sensor 65 that is fixedly disposed on the plate 22, in order to be able to establish the vertical position of the hood 36 and thus the rods 26 and thus the block 29 and thus the pressure lining 31.

There is a bellows structure between the plate 24 and the block 29, comprising a flexible bellows 28 and two attachment plates 27a, 27b for attachment to block 29 and plate 24, respectively. The inside of the bellows 28 is in fluid connection with a source of pressurised air via nozzle 38 and line 37, which source is regulated by a control device to which the sensor 65 as well delivers a number of data.

Due to the regulation of the air pressure the bellows 28 may be expanded to a larger or lesser extent, as a result of which the press-on force of the lining 31 may also be regulated.

In the control unit a wanted signal for the line sensor 65 is set, related to a wanted position of the lining 31 that presses on the upper moulds 40. When after closing the upper moulds 40 the lining 31, due to supply of pressurised air into the bellows 28, cannot move in accordance with the position set for the line or distance sensor 65, this is a sign that the upper mould 40 does not close properly. In that case the control unit will drain off pressure from the bellows 28. The control unit then signals the operator, wherein the machine is automatically stopped.

Figure 4B:
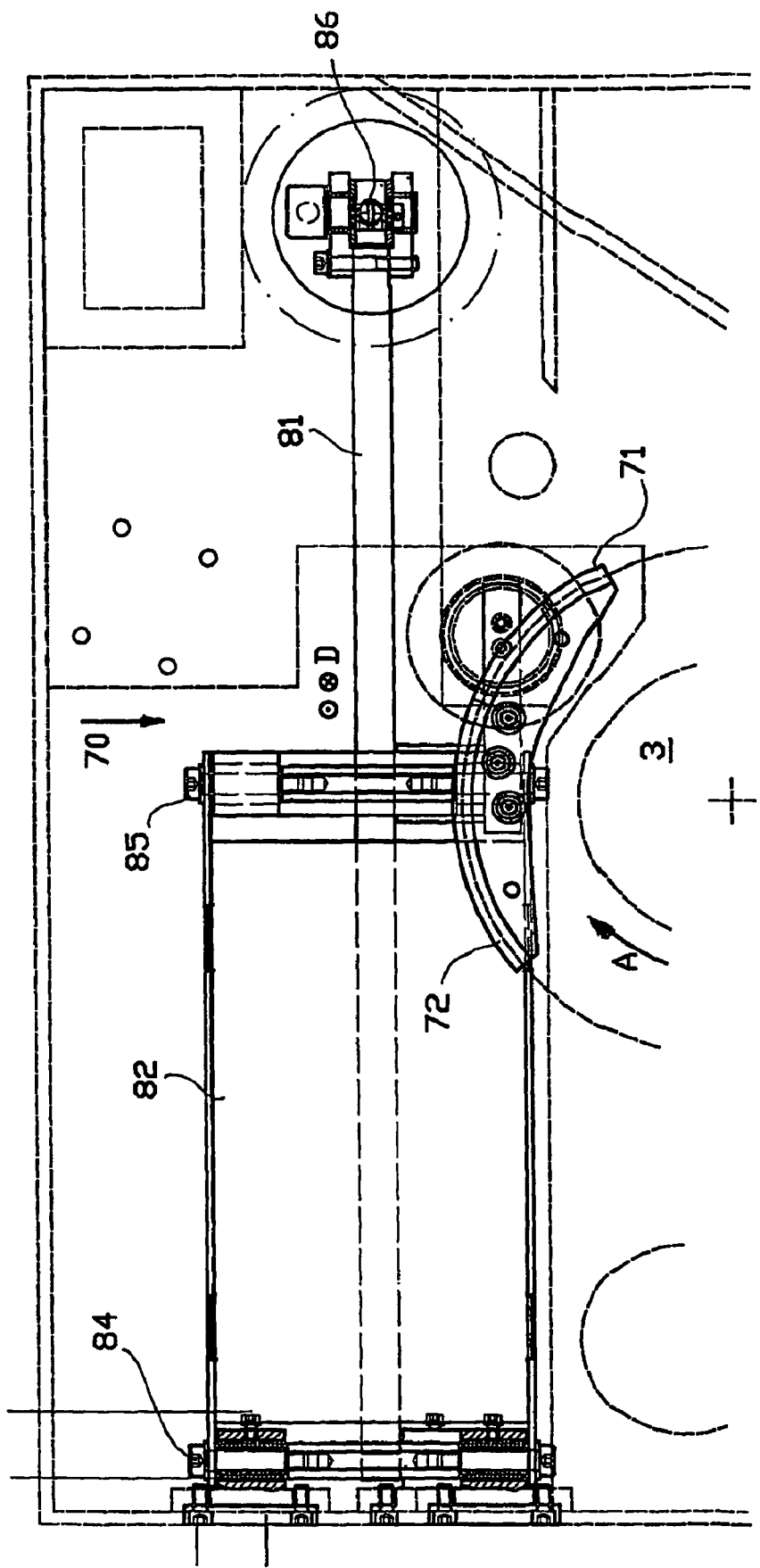
FIG. 4B shows a front view of the device of FIG. 4A.
Figure 4C:
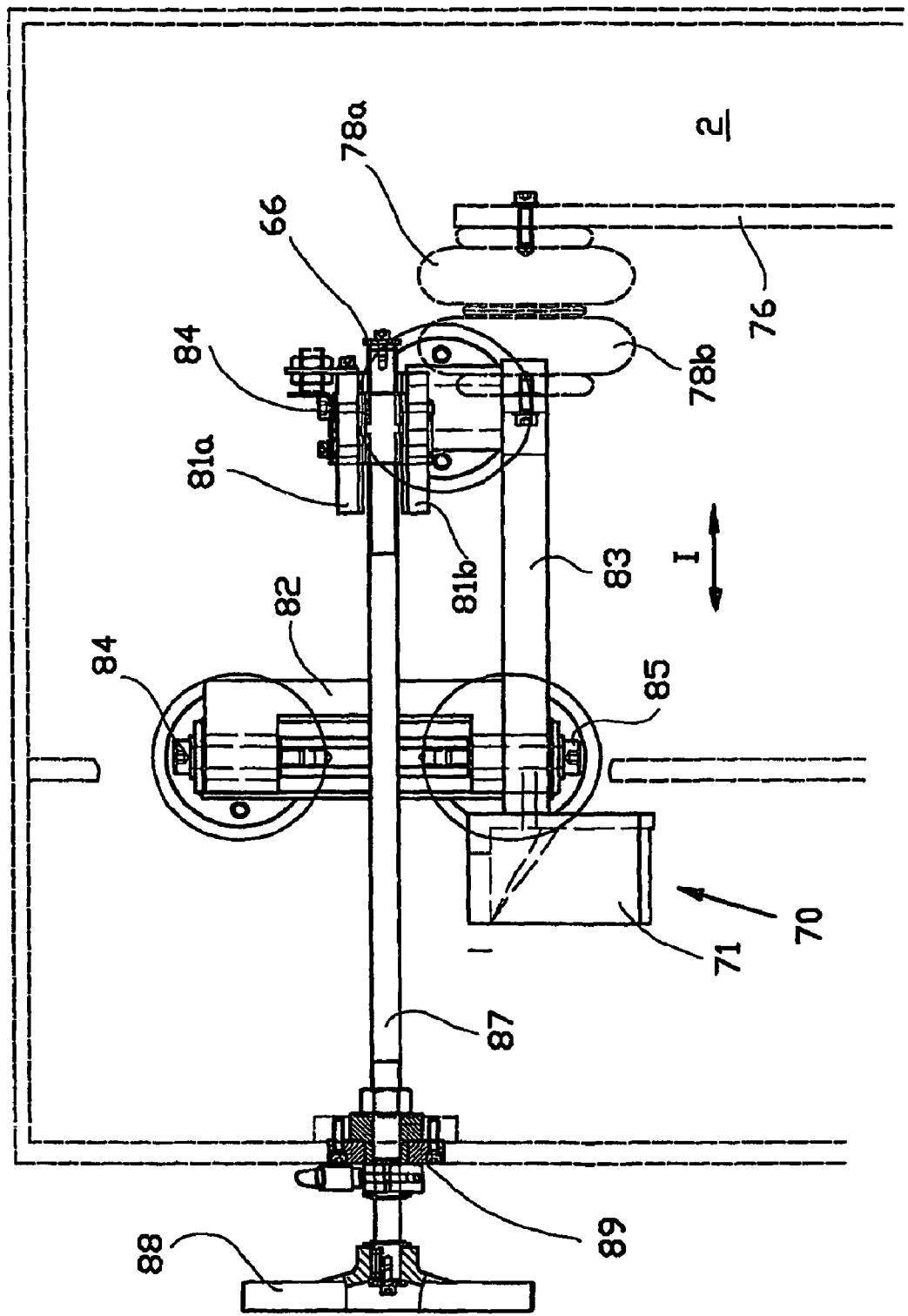
FIG. 4C shows a side view of the device of FIGS. 4A and 4B.

For the other movable component of the mould cavities, the piston 91, such a bellows mechanism 70, shown in the FIGS. 4A-C, has also been provided. FIG. 4A shows a press-on pin 90, at one end of which a pressure piston 91 has been attached. The other end forms an operation end 92 provided with a U-shaped holder 93 with a freely rotatable roller 94. In order to move the piston 91 in the direction M in the mould cavity, the end 92 runs past an inclined guiding edge 72 of, as can be seen in FIG. 4B, a plate 71 bent in the vertical plane. The curvature of the plate 71 follows the path of the press-on pins 90 connected to the drum 3. The press-on pins 90 are adjustable in the direction M in longitudinal grooves in the surface of the drum 3 which grooves are not further shown.

The guiding edge 72 changes into a slightly recessed guiding edge 74 via a protrusion 73, and then ends in a protrusion 75. The roller 94 runs past the edge 72 as a result of which the piston 91 is gradually moved into the mould cavity. Ended up at the protrusion 73, the confectionery is pressed on in a pre-pressing in order to fill the mould cavity. Subsequently the roller 94 moves along the path 74, slightly back, due to which the pressure is slightly reduced, in order to facilitate the pressing in of the lollipop stick at the other side of the mould cavity. In drum axis direction, the protrusion 75 extends slightly further than the protrusion 73 and has a running length for the roller 94, in this case a plane perpendicular to the drum axis. In this track (no point) a full post-pressing takes place. The post-pressing path is relatively long, as a result of which also in complex moulds, such as moulds for figurines, the mould cavity will be filled through and through and the manufactured lollipops will be firm and intact.

The rollers 94 make a friction-free motion along the edges 72-75 possible. The path length of the recess 74 is for instance 15 mm and the post-pressing protrusion is 75 is 25 mm. The recess 74 may be recessed 3 mm back with respect to the protrusion 73 and 6 mm with respect to portion 75.

The L-shaped plate 71 is fixedly attached to a rigid horizontal plate 83, which at the location of hinges 85 is hinged to hinge rod 81 and 82. At an end at the location of hinges 84, the hinge rods 81 and 82 are hinged to the frame 2, so that as a result a kind of parallelogram structure is formed. The arm 81 is extended by a portion 81a, at the end of which a ball-shaped end 86 of an adjusting rod 87 is rotatably accommodated, and slidable in longitudinal direction of the rod. In longitudinal direction the position of the adjustment rod 87 can be altered with respect to the frame 2 by means of a hand wheel 88, with which the rod 87 can be adjusted due to threaded engagement at the location of 89. The position of the ball-shaped end 86 is stored in the control device/unit.

As can be seen in FIG. 4B, the arm 82 is constructed relatively high, as a result of which it is ensured that the plate 71 will reliably swing in the horizontal plane. The hinge point 85 is in line with the line of force. The attachment of the plate 71 to the plate 83 is such that the resultants of the forces as a result of engagement on the press-on pins coincides with the plate 83, so that torsion/friction is prevented as much as possible.

At the rear end the mechanism 70 is provided with a bellows structure, this time consisting of two bellows 78a, 78b, having a fixed plate 79 in between them and attachment plates 77 and 80 at their ends, for attachment to a fixed structure part 76 and the plate 83, respectively. Near the end of the arm 81, 81a a fixedly positioned line or distance sensor 66 is situated, with which line or distance sensor the control device is able to define the position of the arm end with respect to the ball end 86. This may take place rather accurately, as the arm end of the mechanism 70 will go through the largest movement.

When by means of the sensor 66 it is established that the guide plate 71 is pressed back, which is caused by a press-on pin 90 not being able to slide sufficiently far into the mould cavity, the control device drains off/vents pressure in the bellows structure 78a, b. This prevents that in continued movement of the drum in the direction A, the pressure tension in the press-on pin 90 becomes too high, due to which it would otherwise break.

Figure 6B:
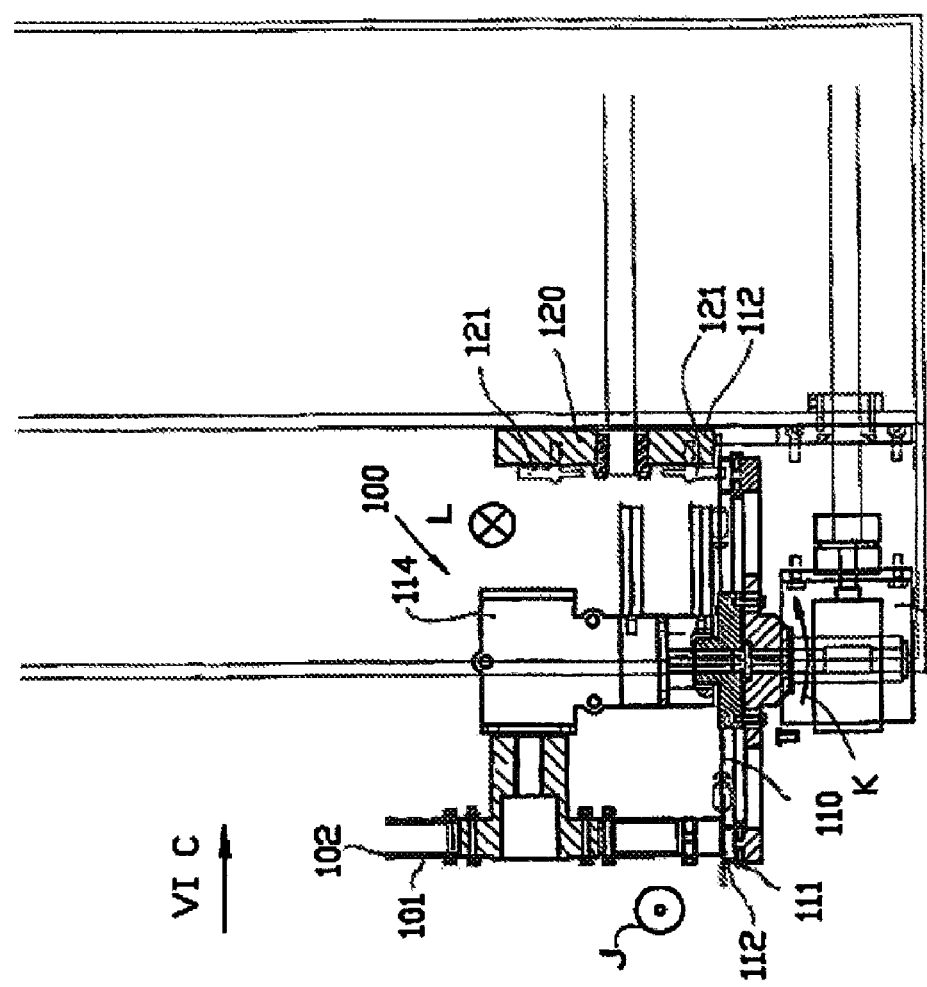
FIGS. 6A, 6B, 6C and 6D show a front view, a side view in cross-section and a view according to arrow VIC, respectively, of a device for converting the orientation of sticks of lollipops manufactured with the device of FIG. 1 and a picture of a clamp used therein.
Figure 6A:
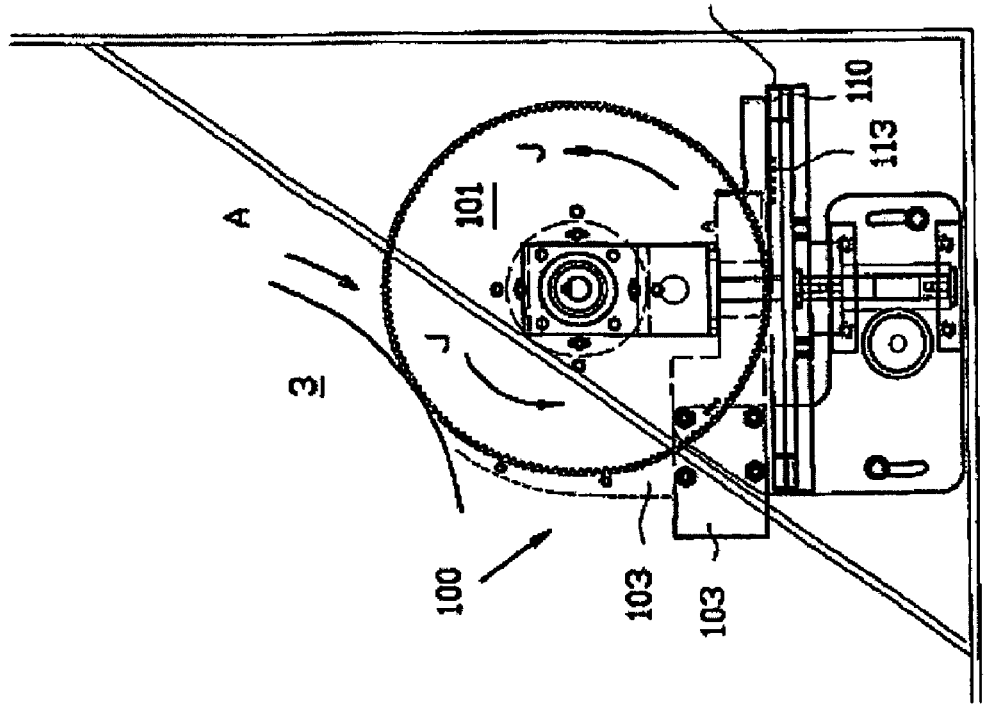

When the lollipops have been formed, they can be taken out of the drum 3, after the guide 54 with guiding edge 55 has opened the upper moulds 40 again. In a manner known per se this takes place by means of a transfer wheel, designed double, such as transfer wheel 101 shown in FIGS. 6A and 6B, provided with recesses 102 in the circumferential edge for accommodation of the lollipop sticks. This takes place in the upper path of rotation in the direction J of the transfer wheel 101. In case of continued transport by this wheel 101 the lollipop sticks are kept radially confined by means of curved guide members 103.

Figure 6C:
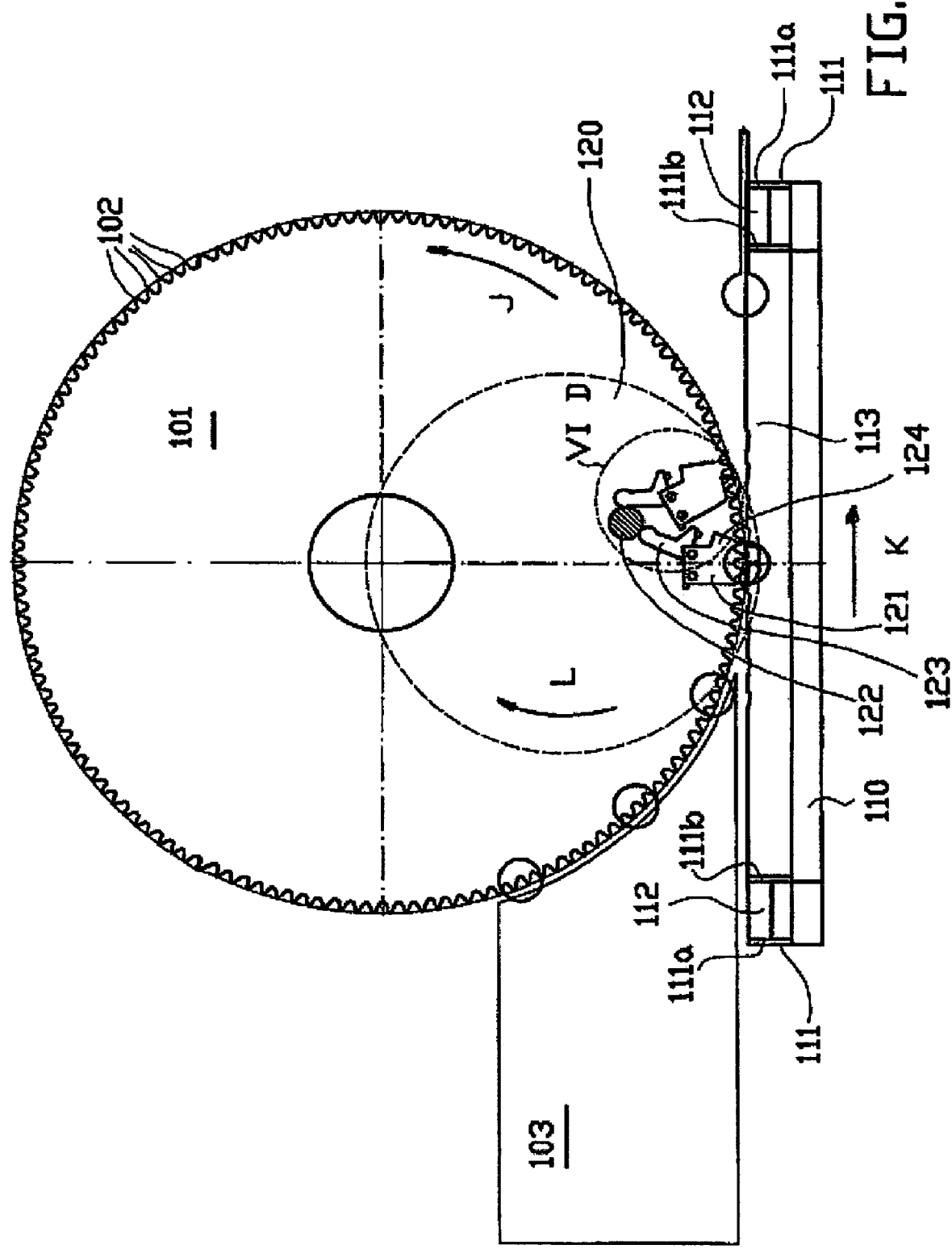
Figure 6D:
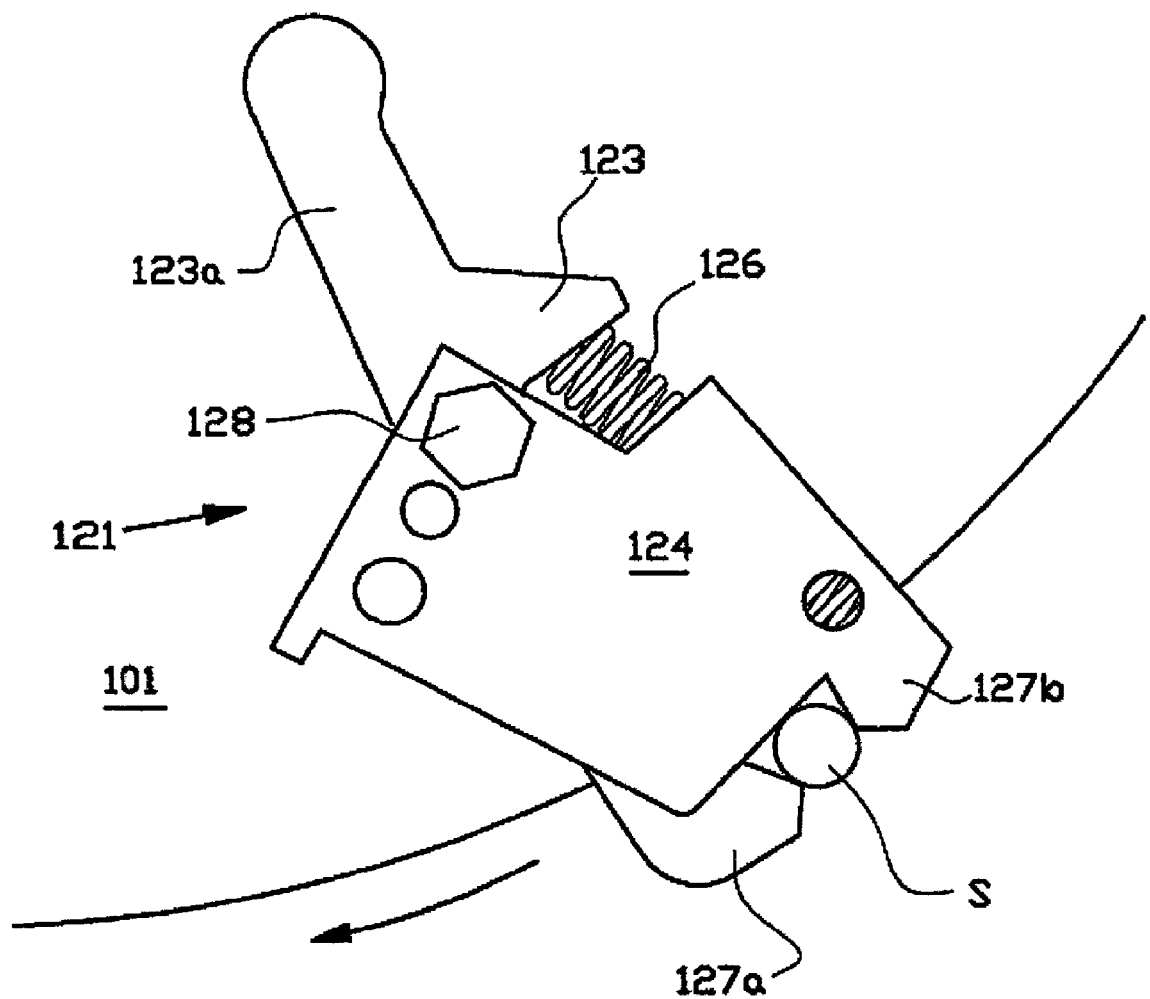

The transfer mechanism 100 in the FIGS. 6A, 6B and 6C is first of all characterised in the presence of a second transfer wheel 110 having a vertical axis of rotation. The wheel 110 is provided with a circumferential edge 111, on which two rings 111a, b provided with saw teeth 113, with short edges at the downstream side thereof and defining a slit 112 in between them. In the lowest point of rotation of the disks 101, the lollipops are released (the curved guide members 103 end there) to two series of recesses 113 and are taken along in them in the direction K to a position preferably diametrically opposite. At that location there is for instance a conveyor of for instance a cooling machine having a conveyor chain on which stick clamps have been disposed. Special in this example is that the stick clamps—that are known per se—have been disposed on a rotating disk 120, and convey the lollipops from a lowermost position to for instance an uppermost position, where they can be transferred to another conveyance means, for instance a next disk provided with stick clamps (for instance in a train of a number of such disks). Such a set-up can also be used for transporting lollipops from a distribution disk—that is known per se—, on which they are singled from bulk, to a packaging machine. Advantageously the disk is rigid and the position of the stick clamps is positively defined, due to which the position of the sticks and the location of engagement is determined and known. The stick clamps 12 (vide FIG. 6D) comprise a first clamping member 123 and a second clamping member 124, said second clamping member 124 being fixedly and non-rotatably secured to the wheel 101. The clamping members 123 and 124 are provided with clamping jaws 127a, b. The first clamping member 123 is rotatable with respect to the second clamping member 124 and to the wheel 101 about axis 128 and is provided with an operation arm 123a. A pressure spring 126 is placed between both clamping members, said spring 126 biassing the first clamping member 123 with clamping jaw 127a towards the clamping jaw 127b.

The disk 120 is rotated in the direction L. At the take-in point, where the stick clamps may reach into the slit 112, a cam 122 is fixedly positioned, against/along which the operation arm 123a of the first clamping member 123 of the stick clamps 121 runs in order to move the clamping jaw 127a away from the relatively fixed clamping jaw 127b and thus to shortly open the clamping jaws of the stick clamps 121 for engaging and then clamping a stick. At the top of disk 120 a same cam can be provided for discharging the sticks at that location.

The invention claimed is:

1. A device for manufacturing lollipops comprising:
    a) a rotatably driven drum with a casing;
    b) a plurality of lollipop moulds at the circumference of the casing;
    c) a supply for supplying a strand of lollipop material to the plurality of lollipop moulds; and
    d) a discharge for lollipops formed in the plurality of lollipop moulds;
    wherein the drum is disposed on a hollow shaft;
    wherein the area between the casing and the hollow shaft defines an annular space;
    wherein the plurality of lollipop moulds comprise lower moulds that are solid with the casing and upper moulds that are hinged to the lower moulds;
    wherein the hollow shaft is provided with a first passage and a second passage, each forming a fluid connection between the cavity in the hollow shaft and the annular space;
    wherein the hollow shaft is provided with a fluid supply and a fluid discharge so that the fluid discharges through the first passage or second passage into the annular space;
    wherein the fluid supply is in fluid connection with a pressure source for cooling air; and
    wherein the casing with the lollipop moulds detaches and re-attaches from the device and is slid on the hollow shaft when being attached or detached.

2. The device according to claim 1, wherein the casing is rotatable about the hollow shaft.

3. The device according to claim 1, wherein the hollow shaft is provided with a longitudinal partition which separates the supply from the discharge.

4. The device according to claim 1, wherein the inner surface of the casing is provided with cooling ribs.

5. A device for manufacturing lollipops comprising:
a) a rotatably driven drum with a casing;
b) a plurality of lollipop moulds at the circumference of the casing;
c) a supply for supplying a strand of lollipop material to the plurality of lollipop moulds; and
d) a discharge for lollipops formed in the plurality of lollipop moulds;
wherein the lollipop moulds are bounded by mould members, of which at least one is movable from a free position to a wanted mould position;
wherein the movable mould member exerts pressure on the lollipop mass in the lollipop mould when the movable mould member moves from a free position to a wanted position; and
wherein the device further includes a means for stopping the motion of the mould member towards the wanted mould position, before the mould member reaches the wanted mould position so that in case of a deviation in motion the deviation is detected by a detection means.

6. The device according to claim 5, wherein the detection means are adapted for detecting an impediment in the movement of a part.

7. The device according to claim 5, wherein the detection means are adapted for detecting a certain pressure build-up.

8. The device according to claim 5, wherein the part is an upper mould, which is hinged to the drum and movable between an open position for access of lollipop material or removal of the lollipop formed, to or from, the lollipop mould.

9. The device according to claim 8, wherein use is made of a body having the shape of a segment of a circle, which is movable in a radial direction with respect to the drum;
wherein the body having the shape of a segment of a circle is provided with a carrier and an insert piece of hard material for exerting press-on forces on the upper moulds;
wherein the insert piece is detachably attached to the carrier and is adjustably tiltable with respect to the carrier in order to be suited to a drum of an altered diameter.

10. The device according to claim 6, wherein the part is a pressure/mould piston movable in drum-axial direction,
wherein the device is provided with means for pressing the mould piston in the mould cavity.

11. The device according to claim 10, wherein the means for pressing the mould piston in the mould cavity comprises:
i. a piston rod connected to the mould piston, and
ii. a cam track for axial movement of the end of the piston rod that is opposite the mould piston.

12. The device according to claim 11, wherein the detection means are adapted for detecting a movement of the cam track or the construction parts connected thereto.

13. The device according to claim 11, wherein the piston rods are provided with a roller for engaging the cam track.

14. The device according to claim 1, wherein the means are adapted for operation by medium/fluid pressure or gas pressure, between a fixed part and a movable part.

15. A device for manufacturing lollipops comprising:
a) a rotatably driven drum with a casing;
b) a plurality of lollipop moulds at the circumference of the casing;
c) a supply for supplying a strand of lollipop material to the plurality of lollipop moulds;
d) a discharge for lollipops formed in the plurality of lollipop moulds; and
e) a plurality of pressure/mould pistons located inside of the plurality of lollipop moulds;
wherein the drum is disposed on a hollow shaft;
wherein the pressure/mould pistons are movable in a drum-axial direction, and press the lollipop material into the plurality of lollipop moulds;
wherein the pistons include operation protrusions, such as piston rods, that are guided by a cam track
wherein the cam track includes an inclined run-in portion and a post-pressing portion, so that the pressure is substantially preserved for a certain track length/period; and
wherein the post-pressing portion runs straight, according to a line in a radial plane that is transverse to the drum axis.

16. The device according to claim 15, wherein the piston rods include a roller for engaging the cam track.

17. The device according to claim 16, wherein between the end of the run-in portion and the post-pressing portion, a recessed, slightly pressure-reducing press-on portion is present and/or wherein the post-pressing portion in pressure direction extends further than the end of the run-in portion.

18. A device for manufacturing lollipops comprising:
a) a rotatably driven drum with a casing;
b) a plurality of lollipop moulds at the circumference of the casing;
c) a supply for supplying a strand of lollipop material to the plurality of lollipop moulds; and
d) a discharge for lollipops formed in the plurality of lollipop moulds;
wherein the plurality of lollipop moulds each comprise:
i. a first mould, such as a lower mould that is fixed to the casing; and
ii. a second mould, such as an upper mould that is hinged to the casing, which is movable with respect to the first mould
wherein the second mould includes an open position, where lollipop material is added to the plurality of lollipop moulds or formed lollipops are removed from the plurality of lollipop moulds, and a closed position, wherein the lollipop is formed under pressure; and
wherein the device is further provided with a means for limiting pressure.

19. The device according to claim 18, wherein the pressure limiting means are adapted for limiting the press-on force of the upper moulds on the lower moulds.

20. The device according to claim 19, wherein the first press-on means for the upper moulds comprise a first press-on member that is movably disposed on the device.

21. The device according to claim 20, wherein the device includes a means that are operative by medium/fluid pressure for moving the first press-on member with respect to a fixed part on the device.

22. The device according to claim 21, wherein the means operative by medium/fluid pressure are pneumatic.

23. The device according to claim 21, wherein the pneumatic means comprise a bellows operative between the first press-on member and the fixed part.

24. The device according to claim 20, wherein the first press-on member comprises a body having the shape of a segment of a circle that is movable in radial direction with respect to the drum.

25. The device according to claim 24, wherein the body having the shape of a segment of a circle is provided with a carrier and an insert piece of hard material for exerting press-on forces on the upper moulds, wherein the insert piece is detachably attached to the carrier.

26. The device according to claim 25, wherein the insert piece is adjustably tiltable with respect to the carrier.

27. The device according to claim 20, further including a means for establishing a movement of the first press-on member in radial outward direction with respect to the drum, as well as a means for influencing the press-on force of the first press-on member in response to a signal of the means for establishing a movement of the first press-on member.

28. The device according to claim 18, wherein a mould piston that is movable in a drum-axial direction has been placed at every lollipop mould;
wherein the device is further provided with second press-on means for pressing the mould piston into the mould cavity; and
wherein the pressure limiting means are adapted for limiting the press-on force exerted by the mould piston.

29. The device according to claim 28, wherein the second press-on means for the mould pistons comprise a second press-on member, that is disposed on the device so as to be movable in drum-axial direction.

30. The device according to claim 29, provided with a means operative by medium/fluid pressure for moving the second press-on member with respect to a fixed part on the device.

31. The device according to claim 30, wherein the means operative by medium/fluid pressure are pneumatic.

32. The device according to claim 30, wherein the pneumatic means comprise a bellows that is operative between the second press-on member and the fixed part.

33. The device according to claim 29, wherein the second press-on member comprises a body having a piloting edge for drum-axial and a press-on motion of the free end of pressure pins that project from the side of the mould pistons that faces away from the mould cavities.

34. The device according to claim 29, wherein the second press-on member is attached to fixed parts of the device by means of a parallelogram structure.

35. The device according to claim 29, further including a means for establishing a movement of the second press-on member in an axial outward direction with respect to fixed parts of the device, as well as with a means for influencing the press-on force of the second press-on member in response to a signal of the means for establishing a movement of the second press-on member.

36. The device according to claim 34, wherein the establishing means are operative near and relatively freely movable vertex of the parallelogram structure.

37. A device for manufacturing lollipops comprising:
a) a rotatably driven drum with a casing;
b) a plurality of lollipop moulds at the circumference of the casing;
c) a supply for supplying a strand of lollipop material to the plurality of lollipop moulds; and
d) a discharge for lollipops formed in the plurality of lollipop moulds;
wherein the device further includes a means for inserting a lollipop stick into the lollipop mould;
wherein the lollipop stick is oriented in a direction parallel to the drum axis;
wherein the lollipop heads are situated at the side of the sticks closest to the device;
wherein the device comprises:
i. a means for taking the lollipops out of the plurality of lollipop moulds and
ii. a means for transporting the lollipops;
wherein the lollipop sticks are parallel to the drum axis during transportation and include a first orientation where the lollipop head is closest to the device;
wherein the device further includes a means for converting the orientation of the lollipop to a second orientation; and
wherein the lollipop is discharged in the second orientation.

38. The device according to claim 37, wherein the conversion means are adapted for a conversion in an orientation of 180 degrees.

39. The device according to claim 37, wherein the conversion means comprise a number of cooperating transport disks, of which the axes of rotation are perpendicular to each other.

40. The device according to claim 39, wherein the conversion means comprise a train of at least two transport disks.

41. A device for transferring lollipops with sticks from a location of receipt to a location of discharge comprising:
a) a rotatingly driven disk and
b) a series of stick clamps fixedly attached to the rotatingly driven disk, wherein the stick clamps comprise:
i. a first clamping member, and
ii. a second clamping member;
wherein the first clamping member and the second clamping member each include a clamping jaw;
wherein the first clamping member is movable and the second clamping member is fixed;
wherein the stick clamp is biassed to a—stable—closed position, in which the two clamping jaws clamp a stick;
wherein the clamped stick is held by the two clamping jaws parallel to the disk axis;
wherein a fixedly positioned operation means, such as a cam, engages an operation arm of the first clamping member, so that the clamping members are urged apart to an open position, where a stick is received by the stick clamp or taken out the stick clamp; and
wherein the first clamping member is biased towards the second clamping member and the first clamping member is temporarily movable away from the second clamping member, by the operation means.

42. A device for manufacturing lollipops comprising:
a) a frame and
b) a drum located on the frame;
wherein the drum includes a casing with a circulating series of lower moulds thereon and a series of upper moulds;
wherein the upper moulds are movable between an open position, for receipt of lollipop material or discharge of a lollipop, and a closed position for forming a mould cavity,
wherein the casing is detachably connected to the frame as one unity.

43. The device according to claim 42, wherein the casing is disposed on a hollow shaft, that is stationary and on which bearings for the casing are provided, wherein the casing is detachable from the hollow shaft and the hollow shaft is attached to the frame.

44. A device for manufacturing lollipops comprising:
a) a frame and
b) a drum located on the frame;
wherein the drum includes a casing having a circulating series of lower moulds thereon and a series of upper moulds that are movable between an open position, for receipt of lollipop material or discharge of a lollipop, and a closed position for forming a mould cavity, wherein the upper moulds are provided with an accommodation space for slidingly accommodating a guide that is fixed to the frame for motion of the upper moulds.

45. The device according to claim 44, wherein the guide is a formed piece or a moulded piece, such as a bent plate, or a bent rod.

46. The device according to claim 44, wherein the guide defines a guiding edge and the accommodation space surrounds the guiding edge for more than 180 degrees, considered in cross-section perpendicular to the guiding edge.

47. The device according to claim 44, wherein in the closed position of the upper moulds the accommodation space is oriented axially away from the frame.

48. The device according to claim 44, wherein the guide has a path length corresponding to the length of the path of the casing between the point of receipt and the point of discharge.

49. The device according to claim 44, wherein the upper moulds are hinged to the drum, and the hinge is situated closer to the frame than the free end of the upper moulds.

\* \* \* \* \*